April 10, 1928.
K. C. LIVERMORE
1,666,016
TWO-WAY PLOW
Filed Sept. 20, 1920
3 Sheets-Sheet 3
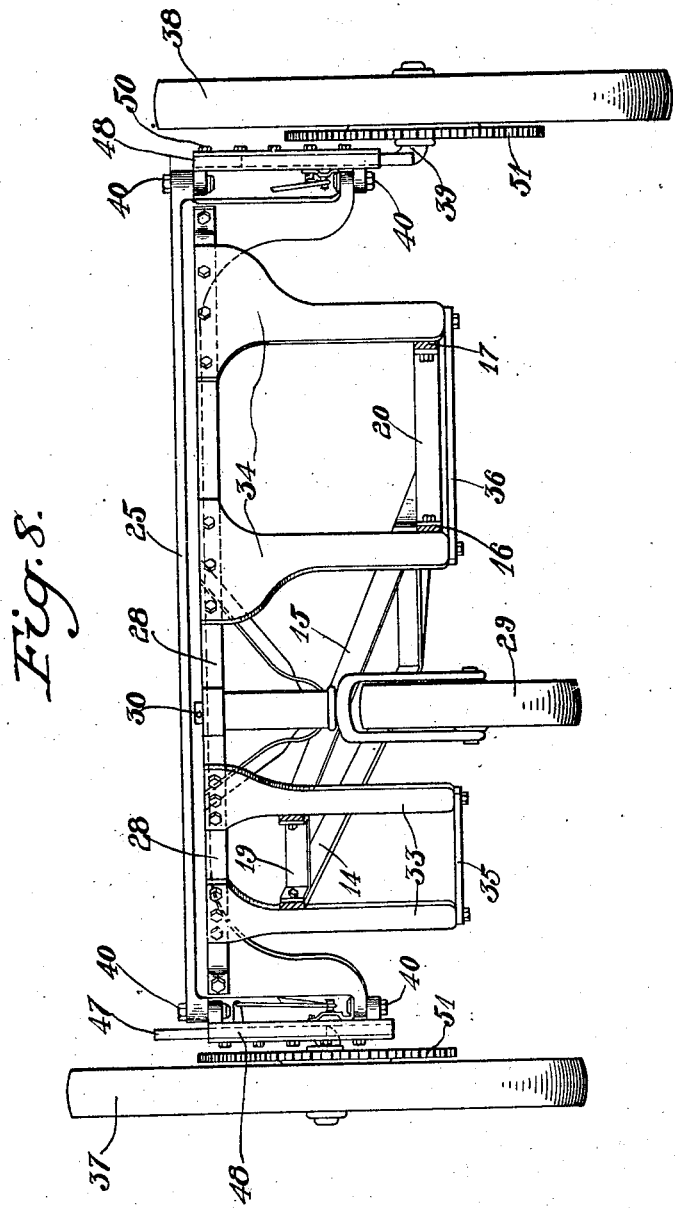

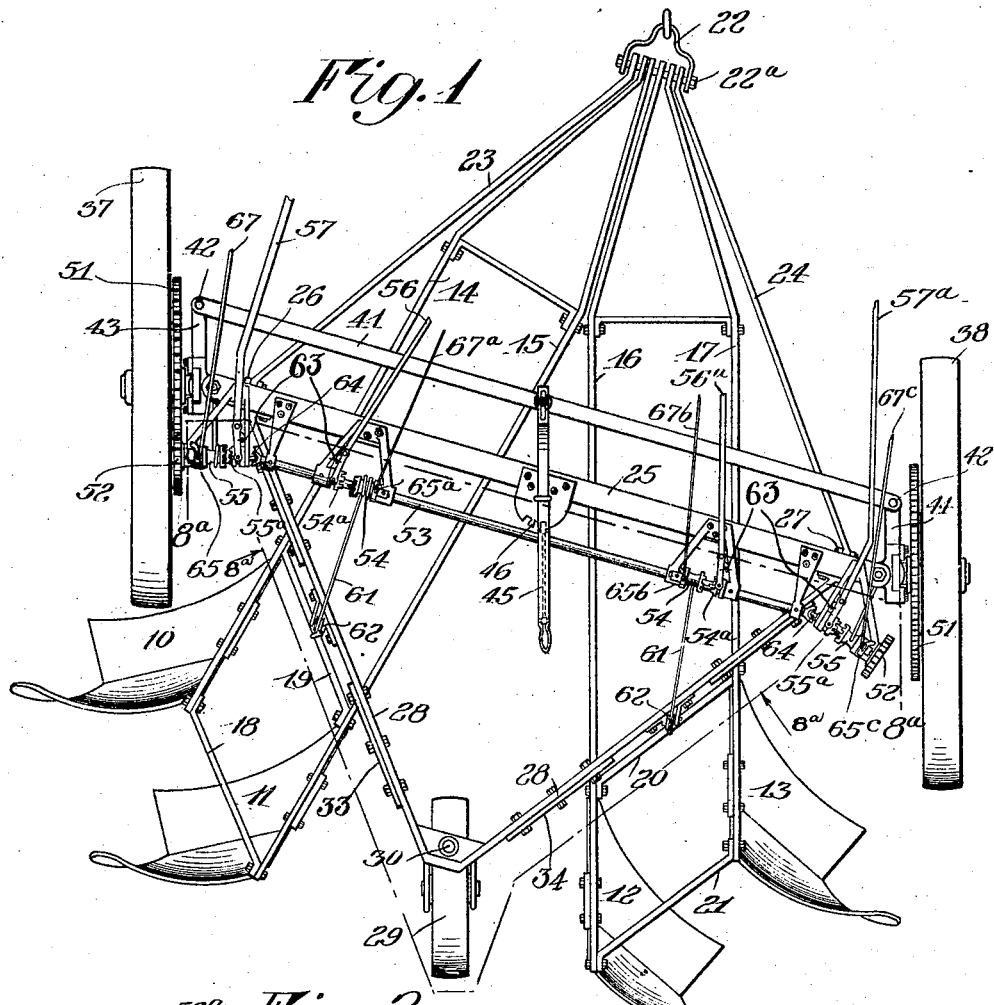

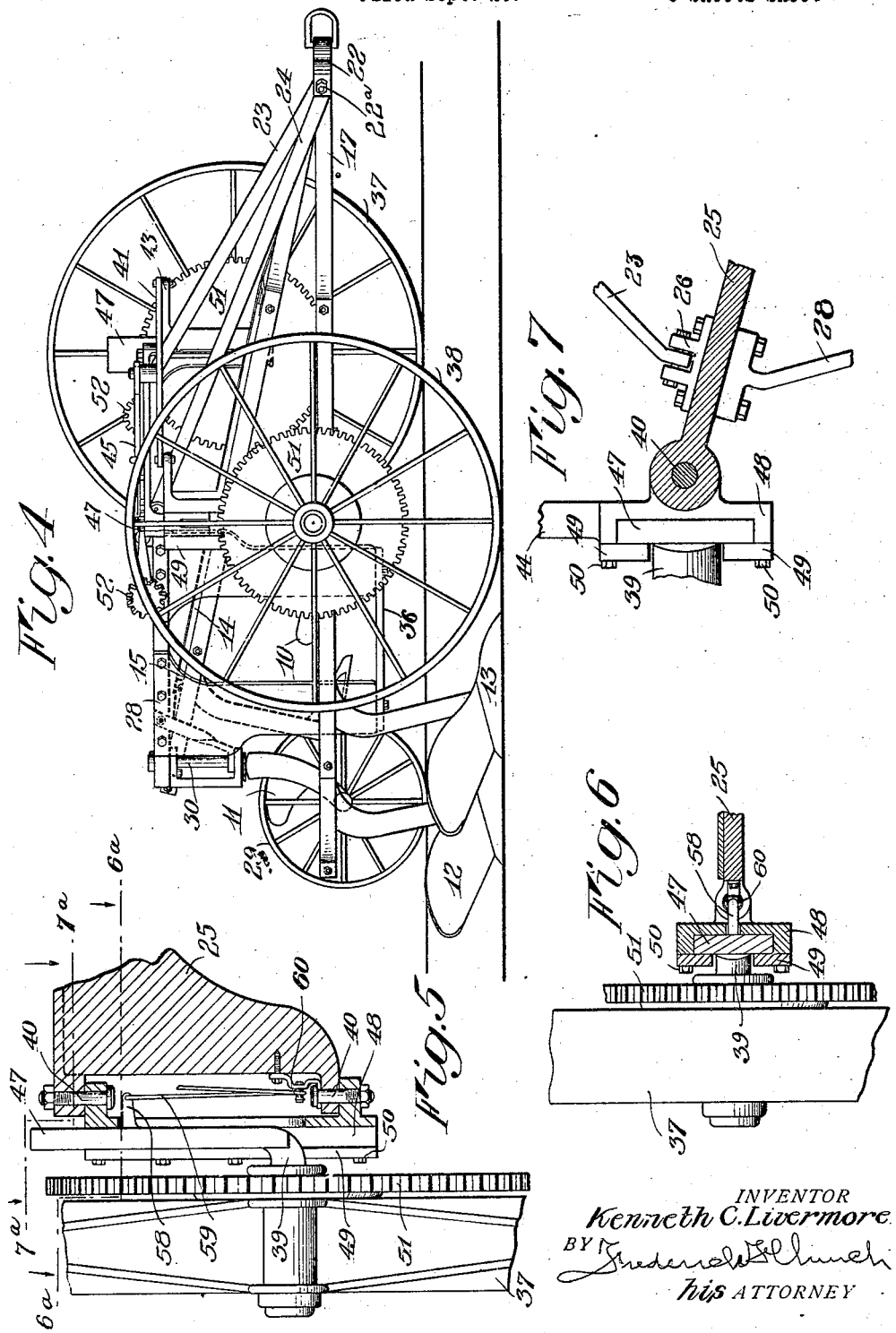

Patented Apr. 10, 1928.

1,666,016

UNITED STATES PATENT OFFICE.

KENNETH C. LIVERMORE, OF ITHACA, NEW YORK.

TWO-WAY PLOW.

REISSUED

Application filed September 20, 1920. Serial No. 411,558.

This invention relates to ground working tools, such for example, as plows and similar tools adapted to turn over the soil. The object of my invention is to provide a means whereby plows and similar ground working tools may be drawn with the greatest facility, minimum of resistance and certainty of correct alinement, which means is particularly adapted for use with a plurality of independently operable tools such as two-way plows. To these and other ends the invention resides in certain improvements and combinations as will be hereinafter more fully described, the novel features being pointed out in the claims at the end of the specification.

In the drawings:

Figure 1 is a plan view of a two-way gang plow with the right hand gang in operative position.

Figure 2 is an enlargement of the right hand end of the cross member and adjusting shaft.

Figure 3 is a section on the line $3^a$—$3^a$ of Figure 2.

Figure 4 is a side view of Figure 1.

Figure 5 is a detail of the wheel elevating mechanism.

Figure 6 is a section on the line $6^a$—$6^a$ of Figure 5.

Figure 7 is a section on the line $7^a$—$7^a$ of Figure 5.

Figure 8 is a rear view of the main frame with parts broken away.

Similar reference characters through the several views indicate the same parts.

In the drawings 10 and 11 are plows which constitute one set while 12 and 13 constitute the other set, rigidly secured to separate plow carrying frames one of which comprises the parts 14, 15, 18 and 19 and the other the parts 16, 17, 20 and 21. As shown, each set or gang of plows is arranged at a fixed horizontal angle with each other and pivotally secured to the draw pin $22^a$ to which is attached the attaching member or single point of attachment 22 for the drawing force of the machine. Suitable side bars 23 and 24 pivotally secured at 26 and 27 to the cross member 25 or main frame of the machine cause the fixed point of attachment 22 to be always in a fixed relation to the two sets of plows and yet permit the point 22 to raise or lower with any unevenness of the ground. The rear frame comprises the side bars 28 fixedly secured to the cross member or main frame 25 and carries the caster wheel 29 pivotally mounted at 30 so that the wheel may always be automatically alined with the direction of movement of the machine. Depending from the side bars 28 of the rear frame are the guide aprons 33 and 34, shown in Figure 8, between the bottom edges of which are secured the strengthening and supporting pieces 35 and 36 which prevent the operative plow from digging into the ground any more than a maximum amount below the main frame should there be any tendency therefor.

The depth of the furrow is regulated by the height of or the adjustment of the main side supporting wheels 37 and 38 which are separately vertically adjustable by having the axle 39 of each wheel bent around to constitute a vertical or upstanding portion 47 slidable in the guide channels 48 provided with securing pieces 49 and bolts 50 to hold the upstanding projections 47 in place in the guide channels. The main wheels 37 and 38 are always in parallelism and pivotally secured to the main frame or cross member 25 by means of the pins 40 at each end thereof. In order to dispose the side wheels at different angles relative to the cross member 25, an auxiliary bar 41 is pivoted at each of its ends at 42 to the projecting arms 43 and 44 fixed to the guide channels 48. For purposes of adjusting the wheels at the desired angle to the main frame, a handle 45 is secured to the auxiliary bar 41 and pivotally attached to the cross member 25 and cooperates with notches 46 in a plate attached to the main frame in order to hold the handle 45 and the side wheels 37 and 38 movable therefrom in the angularly adjusted position. In the embodiment shown there are only three positions illustrated for the wheels, the mid-position with which the handle 45 cooperates when the wheels are substantially at right angles to the cross member 25 for drawing the plow with neither set of tools in operative position, the left hand notch with which the handle 45 cooperates when the plows 10 and 11 are in operative position, and the right hand notch in which the handle is shown cooperating when the right hand gang is in working position.

Each of the side wheels 37 and 38 has fixedly secured thereto a large driving gear 51, one of which is adapted to cooperate with one of the driven gears 52 when either gang of plows is working. The driven gear 52 drives the adjusting shaft 53 which is fixed relative to the cross member 25 and contains the universal joints 64 necessitated by the angular disposition of the ends of the shaft. Provided on the adjusting shaft 53 but freely rotatable thereon are the winding drums 54 and 55 for independently elevating either wheel or moving either gang of plows to an inoperative position. These winding drums may be rotated by means of the complementary cooperating clutch members $54^a$ and $55^a$, each of which is keyed to the shaft 53 but slidable thereon by means of the operating levers 56, $56^a$, 57 and $57^a$ respectively, which may lead to a position adjacent the driver's seat if the device is used as a sulky plow, or may lead to the operator's position if tractor drawn. In order to raise or lower each wheel, a lug 58 projects from the upstanding portion 47 of the axle through the back of the guide channel 48 to which is attached a chain or cable 59 passing downwardly over a pulley or sheave 60 fixed to the main frame and upward to the winding drum 55. For retracting either set of plows from cooperation with the ground, a chain or cable 61 passes over each winding drum 54 to the pulley 62 and down to the cross pieces 19 and 20 to which the lower end of the cable may be attached. Retractile springs 63 hold the operating levers 56, $56^a$, 57 and $57^a$ normally in a position in which the complementary clutch members do not cooperate. When any cooperating clutch member engages its winding drum to rotate the same, the drum may be held in a partially or fully wound position by means of spring pressed pawls 65, $65^a$, $65^b$ and $65^c$ cooperating with the ratchets 66 fixed on each winding drum. Releasing rods 67, $67^a$, $67^b$ and $67^c$ also leading to the driver's or operator's position are provided for releasing the pawl in order that any one of the winding drums may be unwound as much as desired.

In operation, to adjust the plow in order that one set or gang of plows, for instance the right hand set, may be in working position, the handle 45 may be moved to cooperate with the notch indicated when the side wheels 37 and 38 will be swung about the pivot 40 yet remain parallel with each other. If the machine is being drawn during this operation, the wheel 37 will be moved ahead of the wheel 38 to the position shown, and at the same time the main frame becoming angularly disposed will be swung about the single point of attachment 22 so that the drawing force, single point of attachment and operative plows will be in alinement and parallel wtih the side wheels. Thus a single shifting means is providing for the frame, plows, and the wheels. With the left wheel 37 disposed ahead of the wheel 38 in the position shown, the driving gear 51 of the left wheel is then in cooperation with the left hand driven gear 52 so that the adjusting shaft 53 is driven thereby. The height of the wheels, which determines the depth of the furrow, may be adjusted either before or after the plow is in cooperation with the ground as may be desired. To lower either wheel, which is equivalent to raising the main frame and operative plow, the sliding lever 57 or $57^a$ may be moved into cooperation with whichever winding drum 55 is desired to be operated when the cable 60 will be wound and wheel adjusted relative to the main frame the desired amount, after which the operating lever 57 or $57^a$ may be released to disengage the cooperating clutch members. At the end of the furrow should it be desired to operate with the other gang, the set of plows 12 and 13 may be elevated to an inoperative position by operation of a lever $56^a$ to wind the appropriate drum 54 the desired amount. To lower either set of plows the pawl lever $67^a$ or $67^b$ may be operated to release the pawl or ratchet and allow the desired drum 54 to unwind. In the same way operating the rods 67 or $67^c$ releases the pawl and ratchet of the desired winding drum 55. It will be seen that if the machine is in motion, operating the handle 45 is in effect moving the main frame, fore-frame, and both wheels about the single point of attachment 22 as a pivot.

Among the advantages of my device may be enumerated the ease of alining the operating plows and drawing force by means of the single adjusting handle 45 which not only alines the drawing force and operative plows but at the same time moves the land wheel ahead of the other for a better distribution of forces within the plow frame and a better guiding of the machine. When the sets or gangs are disposed at a fixed horizontal oblique angle to each other, an advantageous lateral space economy results since the inoperative plow is then disposed back of the wheel on the land side in an out of the way position instead of being placed above or at the side of the working plow. The ease of adjustment of the depth of the furrow by adjusting the height of each wheel independently of the other, which adjustment is accomplished from the rotation of the side wheels of the machine when in motion is another noteworthy feature. Also the fact that either set of plows may be retracted to an inoperative position by the same adjusting shaft 53, driven from one of the side wheels is a further advantage. With the plows arranged at a fixed horizontal angle with one another, a rigid and substantial frame results for the two-way plows. One of the most noteworthy features of my invention is the single point of attachment 22 for the drawing force which is definitely fixed relative to each plow yet the wheels and main frame are movable to have the drawing force alined with the line of draft of the operating plow which insures a certainty of alinement. Having the point of attachment 22 fixed relative to the two plows enables a lighter frame to be used and yet affords the necessary rigidity.

Although I have shown and described the invention embodied in a two-way gang plow, it will be readily seen that either set of gang of plows may be regarded as a single tool so that the term tool as used in the claims refers to one of the two-way plows which may be either a single plow or a gang.

I claim as my invention:

1. In an agricultural implement a plurality of separately operable ground tools, a pair of parallel supporting wheels for said tools, mechanism operable by either wheel for raising or lowering one of said wheels relative to the other, a second mechanism operable by the same wheel as the first mentioned mechanism for raising each tool from cooperation with the ground to an inoperative position, attaching means for a drawing force for the implement and a device for moving the operating tool about the attaching means into alinement with the drawing force.

2. In a two way plow, a frame carried on front dirigible wheels and a rear supporting wheel, a forwardly converging draft connection swingable vertically on said frame, rearwardly diverging plow beam structures attached to the front end of said draft connection to swing vertically and means for independently raising and lowering said plow beam structures.

3. In a two way plow, a frame carried on front dirigible wheels and a rear supporting wheel, a forwardly converging draft connection swingable vertically on said frame, rearwardly diverging plow beam structures each having forwardly converging beams attached to the front end of said draft connection to swing vertically and means for independently raising and lowering said plow beam structures.

4. In a two way plow, a frame carried on front dirigible wheels and a rear supporting wheel, a forwardly converging draft connection swingable vertically on said frame, rearwardly diverging plow beam structures attached to the front end of said draft connection to swing vertically, means for independently raising and lowering said plow beam structures, and means for simultaneously steering the front supporting wheels.

5. In a two way plow, a frame carried on front dirigible wheels, said wheels being arranged for vertical adjustment relative to the frame and independently of each other, a forwardly converging draft connection swingable vertically on said frame, rearwardly diverging plow beam structures attached to the front end of said draft connection to swing vertically and means for independently raising and lowering said plow beam structures and holding the same in adjusted position.

6. In a two way plow, a frame carried on front dirigible wheels and a rear supporting wheel, a forwardly converging draft connection swingable vertically on said frame, rearwardly diverging plow beam structures attached to the front end of said draft connection to swing vertically, a vertical guide for each of said plow beam structures and means for independently raising and lowering said plow beam structures.

7. In a two way plow, a pair of wheels, a frame member mounted between said wheels, connections between said member and the wheels permitting the latter to be adjusted to different angular positions with respect to said member, means for effecting such adjustment, a frame extending forwardly from said member, a draft connection on the front of said frame adapted to occupy a position at one side of the median line between said wheels when said member is disposed at an angle to the axis of either wheel, a rear frame connected with said member, a pair of plow carrying frames adapted to be guided vertically upon said rear frame and converging forwardly and having their front ends secured to said draft connection, and means for effecting independent raising or lowering of said plow carrying frames.

8. In a two way plow, a pair of wheels, a frame member mounted between said wheels, connections between said member and the wheels permitting the latter to be adjusted to different angular positions with respect to said member, means for effecting such adjustment, a frame extending forwardly from said member, a draft connection on the front of said frame adapted to occupy a position at one side of the median line between said wheels when said member is disposed at an angle to the axis of either wheel, a rear frame connected with said member, a pair of plow carrying frames adapted to be guided vertically upon said rear frame and converging forwardly and having their front ends secured to said draft connection, and means adapted to be actuated by each wheel for raising one of said plow carrying frames.

9. In a two way plow, a pair of dirigible wheels, a frame connecting said wheels and projecting forwardly and rearwardly thereof, means for simultaneously steering said wheels, said steering means serving to effect relative adjustment between the wheels and frame whereby the former will occupy predetermined angular positions with respect to the frame, a draft connection on the front of the frame, forwardly converging plow carrying frames inclined to the axis of the wheels and adapted to be guided vertically upon the rear portion of the frame and having their front ends pivotally engaging a portion of said draft connection, and means for independently raising said plow carrying frames.

10. In a two way plow, a pair of dirigible wheels, a frame connecting said wheels and projecting forwardly and rearwardly thereof, the wheels being vertically adjustable relative to the frame and to each other, means for simultaneously steering said wheels, said steering means serving to effect relative angular adjustment between the wheels and frame whereby the latter will occupy predetermined angular positions with respect to the frame, a draft connection on the front of the frame, forwardly converging plow carrying frames inclined to the axis of the wheels and adapted to be guided vertically upon the rear portion of the frame and having their front ends pivotally engaging a portion of said draft connection, and means for independently raising said plow carrying frames.

11. In a two way plow, a main frame, dirigible wheels for supporting said frame, steering means for simultaneously effecting relative angular adjustment between the wheels and frame, a draft attachment at the front end of the frame, separate forwardly converging plow carrying frames connected with said draft attachment to swing vertically thereon, vertical guide means for the plow carrying frames, means including a shaft connected with said plow carrying frames to effect raising of the same and means for coupling either wheel with said shaft to effect rotation of the latter during advancement of the machine.

KENNETH C. LIVERMORE.